(12) United States Patent
Fujita

(10) Patent No.: US 6,328,147 B1
(45) Date of Patent: Dec. 11, 2001

(54) CLUTCH FOR MOTORCYCLES

(75) Inventor: Ryoichi Fujita, Tokyo (JP)

(73) Assignee: Fujita Co., Ltd., Tokyo (JP)

( * ) Notice: Subject to any disclaimer, the term of this patent is extended or adjusted under 35 U.S.C. 154(b) by 0 days.

(21) Appl. No.: 09/550,336

(22) Filed: Apr. 14, 2000

(30) Foreign Application Priority Data

Dec. 28, 1999 (JP) ................................. 11-009967

(51) Int. Cl.$^7$ ............................. F16D 13/56; F16D 23/12
(52) U.S. Cl. ...................... 192/70.23; 192/93 A; 192/96
(58) Field of Search ........................... 192/70.23, 70.27, 192/89.24, 93 A, 96, 101

(56) References Cited

U.S. PATENT DOCUMENTS

| | | | |
|---|---|---|---|
| 1,189,355 | * | 7/1916 | Ellett ............................. 192/93 A X |
| 1,207,542 | * | 12/1916 | Gustafson ........................... 192/96 X |
| 2,852,116 | * | 9/1958 | Spase ............................. 192/93 A X |
| 2,931,476 | * | 4/1960 | Zeidler et al. ..................... 192/101 X |
| 3,498,432 | * | 3/1970 | Seibt ................................. 192/70.23 |
| 3,791,501 | * | 2/1974 | Culbertson ........................... 192/93 A |
| 3,848,717 | * | 11/1974 | Culbertson ........................... 192/93 A |

FOREIGN PATENT DOCUMENTS 59-65621 (A) * 4/1984 (JP) .................................... 192/93 A

* cited by examiner

*Primary Examiner*—Richard M. Lorence
(74) *Attorney, Agent, or Firm*—Oblon, Spivak, McClelland, Maier & Neustadt, P.C.

(57) ABSTRACT

When a pressure plate of a clutch for motorcycles and the like is moved to engage and disengage driving friction plates and driven friction plates, a rod driver connected to an operation rod is constructed such that a pair of operation members is assembled so as to face a plurality of guide grooves formed on a surface of interposing balls, wherein the plurality of guide grooves is formed along an imaginary circle having a radius of about 19.3 mm on the faces of each of the operation members, and the balls have a diameter of about 9.5 mm. One of the operation members is rotated with respect to the other operation member to separate the operation members because bottom surfaces of the guide grooves are slanted by an angle of between 13.7° through 14.4° from the faces, and centers of the guide grooves are most deep, as much as about 3.872 mm, in the guide grooves, whereby the clutch is securely disengaged in use by a small force.

4 Claims, 13 Drawing Sheets

F I G . 13
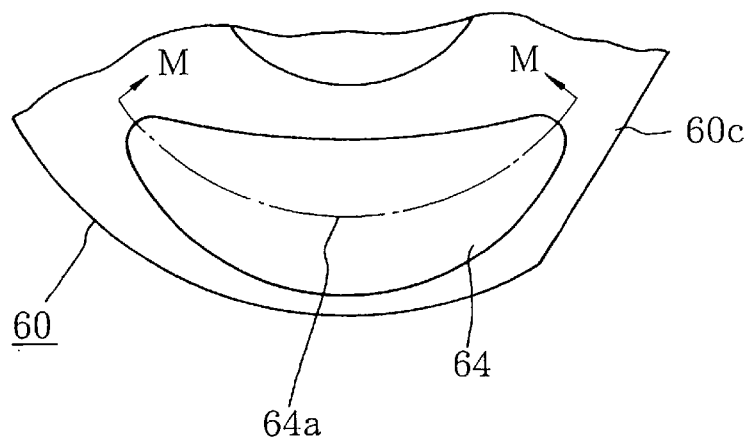
F I G . 14
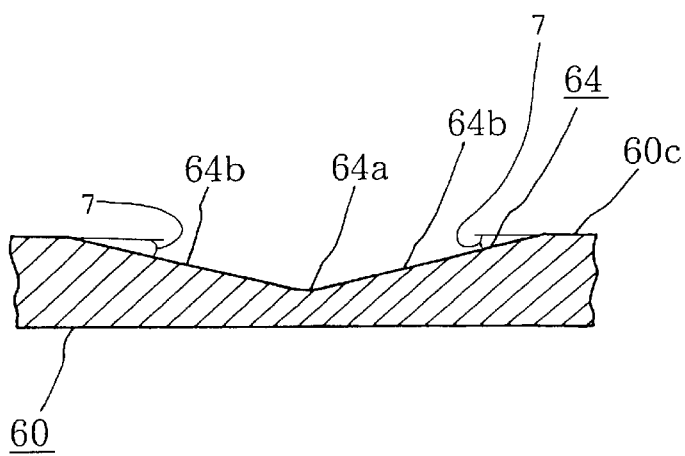

CLUTCH FOR MOTORCYCLES

BACKGROUND OF THE INVENTION

1. Field of the Invention

The present invention relates to a clutch for motorcycles and the like, which clutch enables engagement and disengagement by a small pulling force applied to a clutch lever.

2. Discussion of Background

Generally, motorcycles have a clutch between a driving means on a side of an engine and a drive wheel, which clutch is operated to be engaged and disengaged for transmission of a driving force by pulling and releasing a clutch lever, located in a handle and connected to the clutch through a wire.

When the clutch is operated, a sufficient grasping force is ordinarily required to pull the clutch lever. However, there may be a case where fingers of a hand operating the clutch are substantially fatigued after continuous operations of the clutch.

Further, there may be a case where a rider with a weak grasping force has difficulty in operating a clutch.

Further, such difficulty is increased at the time of engaging and disengaging a clutch of a motorcycle having a high-power engine as a driving means.

SUMMARY OF THE INVENTION

It is an object of the present invention to provide a clutch having a simple structure and enabling an easy disengaging operation by a small pulling force applied to a clutch lever at the time of operating a clutch.

According to a first aspect of the present invention, as shown in FIG. 1, there is provided a clutch including a rod driver (1) for driving an operation rod (40) in a direction of an axis of the operation rod (40), which rod (40) drives a pressure plate (30) urged to push driving friction plates (14) and driven friction plates (27) so as to be engaged with each other against urging by the pressure plate (30), which rod driver (1) comprises:

a pair of operation members (50, 60), on which surfaces are opposite each other and arranged in a direction perpendicular to an imaginary line (2) passing through a central axis of the operation rod (40) and one of which operation members (60) is rotatable around a center axis of the imaginary line (2) and the other operation member (50) is unrotatable, wherein the pair of the operation members (50, 60) respectively has at least two guide grooves (51, 64), best shown in FIG. 6, a central line of which guide grooves (51, 64) is provided in an outer periphery of an imaginary circle having a radius of about 19.3 mm, which guide grooves (51, 64) are separated by a predetermined interval, and cross-sections of which guide grooves (51, 64) are shaped like an arc being a part of an imaginary circle (8) in FIG. 12 having a diameter of about 11 mm in a direction from the imaginary line (2) in FIG. 1 to the periphery of the operation members (50, 60); and balls (70) having a diameter of about 9.5 mm, each of which balls (70) is positioned in each of the guide grooves (51, 64) of FIG. 6 so as to be in contact with a bottom surface of each of the guide grooves (51, 64), and located between pairs of the operation members (50, 60), wherein one of the operation members (60) is separated from the other operation member (50) by a rotational operation around an imaginary circle (6) in FIG. 3 having a radius of about 40.35 mm with the center of the rotational axis (2), wherein the operation rod (40) located in the pressure plate (30) of FIG. 1 is moved by a movement of the other operation member (50) to separate from the one of the operation members (60), and wherein the guide grooves (51, 64) are provided on opposite surfaces of the operation members (50, 60) and respectively have bottom slanted surfaces (51b, 64b), best shown in FIG. 8, with an angle of 13.7° through 14.4° with respect to the opposite surfaces, and a depth of each of the guide grooves (51, 64) is gradually increased toward a center (51a, 64a) and is about 3.872 mm at the center of the guide grooves (51, 64).

According to a second aspect of the present invention, seen in FIG. 1, there is provided a clutch comprising:

a clutch outer flywheel (10);

a clutch center (20) located inside the clutch outer flywheel (10) so as to be rotatable around a rotational axis being the same as that of the clutch outer flywheel (10);

driving friction plates (14) being a plurality of annular plates movably located inside the clutch outer flywheel (10) so as to be moved toward a direction of the rotational axis of the clutch outer flywheel (10);

driven friction plates (27) being a plurality of annular plates movably located outside the clutch center (20) so as to be moved toward a direction of the rotational axis of the clutch center (20), surfaces of the annular plates being arranged opposite to surfaces of the annular plates of the driving friction plates (14);

a pressure plate (30), located in the clutch center (20), for urging to engage closely the driving friction plates (14) and the driven friction plates (27) with a pressure;

an operation rod (40), located in the pressure plate (30), for moving the pressure plate (30) to release the close engagement between the driving friction plates (14) and the driven friction plates (27) against urging on the pressure plate (30); and a rod driver (1) for moving the operation rod (40) in an axial direction of the operation rod (40);

wherein the rod driver (1) includes a pair of operation members (50, 60), which operation members (50, 60) have surfaces opposite to each other, which surfaces are perpendicular to an imaginary line (2) passing through a central line of a rod shaft of the operation rod (40), one of which operation members (60) is rotatably located around a rotation axis of the imaginary line (2) and the other operation member (50) is unrotatably located, and which operation members (50, 60) respectively have at least two guide grooves (51, 64) as seen in FIG. 6, which guide grooves (51, 64) are arranged around an imaginary circle (8) in FIG. 12 having a radius of about 19.3 mm with the center of the imaginary line (2) with a predetermined interval on the surfaces of the operation members (50, 60) in FIG. 6 opposing each other, cross-sections of which guide grooves (51, 64) are like an arc as a part of the imaginary circle (8) having a diameter of about 11 mm in a direction from a center of the imaginary circle (8) to an outer periphery of the imaginary circle (8), and a depth of which guide grooves (51, 64) is largest in a center of each of the guide grooves (51, 64) and becomes gradually small toward both sides of the guide grooves (51, 64), wherein the rod driver (1) in FIG. 1 further includes balls (70) having a diameter of about 9.5 mm, each of which balls (70) is respectively located in each of the guide grooves (51, 64) of FIG. 6 so as to be in contact with a bottom surface of the guide grooves (51, 64) and which are located between the pair of operation members (50, 60), wherein the one (60) of the operation members (50, 60) is separated from the other operation member (50) by a rotation along an imaginary circle (6) in FIG. 3 having a radius of about 40.35 mm with the center of the rotational axis of the one (60) of the operation members (50, 60), wherein the operation rod (40) located in the pressure plate (30) is moved by a movement of the other operation member (50) by separating from the one (60) of the operation members (50, 60), and wherein the guide grooves (51, 64), which are provided in FIG. 6 on the opposing surfaces of the operation members (50, 60) and formed to slant so as to increase gradually the depth thereof respectively toward the center of the guide grooves (51, 64) having a depth of about 3.872 mm at the centers of the guide grooves (51, 64), and the slant (51b, 64b) of each of the guide grooves (51, 64) seen in FIG. 8 is about 13.7° through 14.4° with respect to the opposing surfaces of the operation members (50, 60).

In the thus constructed clutch, it is possible to move the pressure plate (30) urged in FIG. 1 to engage closely the driving friction plate (14) and the driven friction plate (27) with a pressure against urging by rotating the operation members (50, 60) with a relatively small force.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13 is a rear view of the operation member illustrated in FIG. 10 partly omitted;

FIG. 14 is a cross-sectional view of the operation member illustrated in FIG. 13 taken along a line M—M;

DETAILED DESCRIPTION OF THE PREFERRED EMBODIMENTS

A detailed explanation will be given of preferred embodiments of the present invention in reference to FIGS. 1 through 20 as follows, wherein the same numerical references are used for the same or similar portions and description of these portions is omitted.

Figure 1:
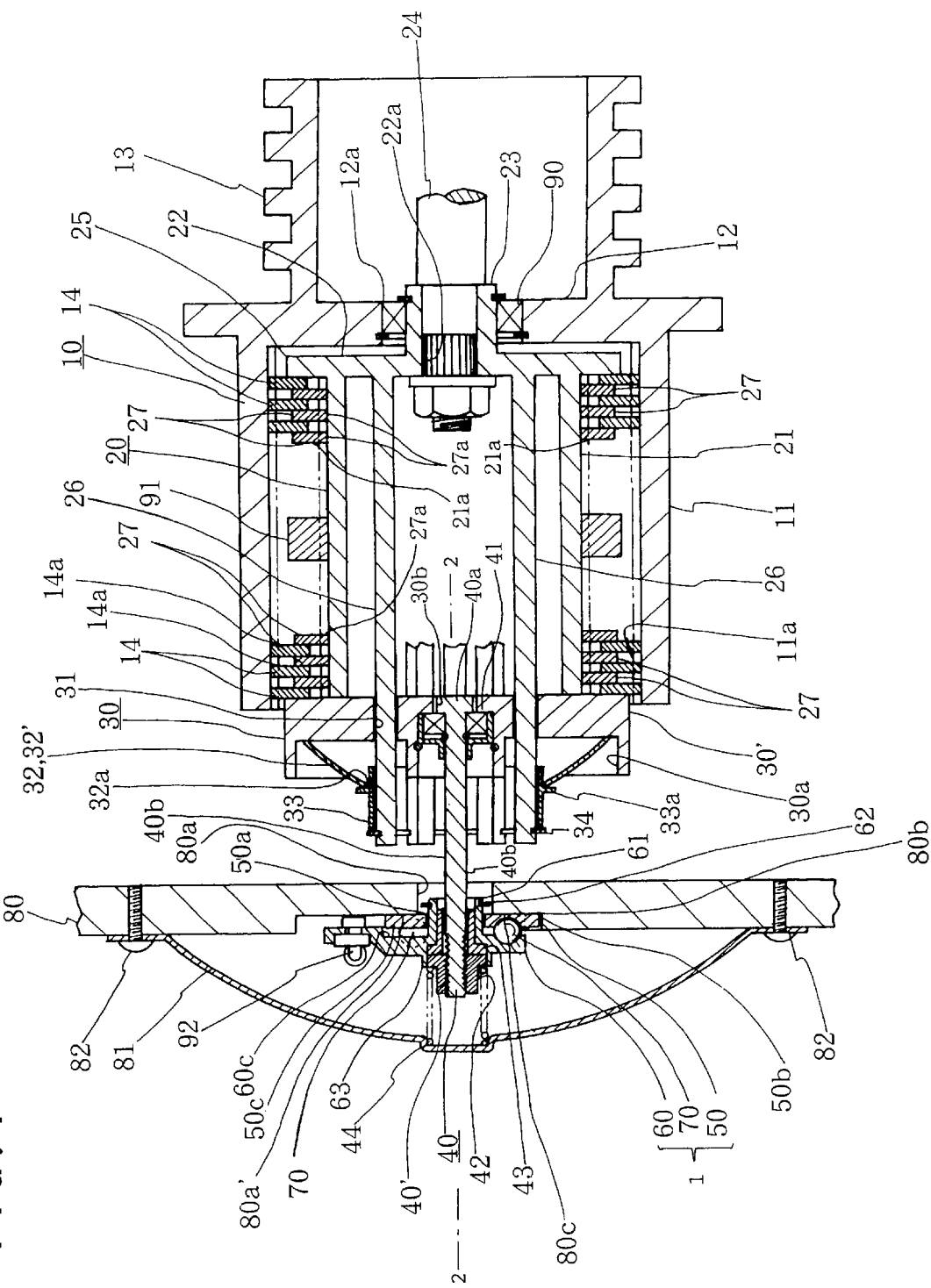
FIG. 1 illustrates a structure of an important portion of a clutch according to an embodiment of the present invention in a state where driving friction plates are in contact with driven friction plates.
Figure 2:
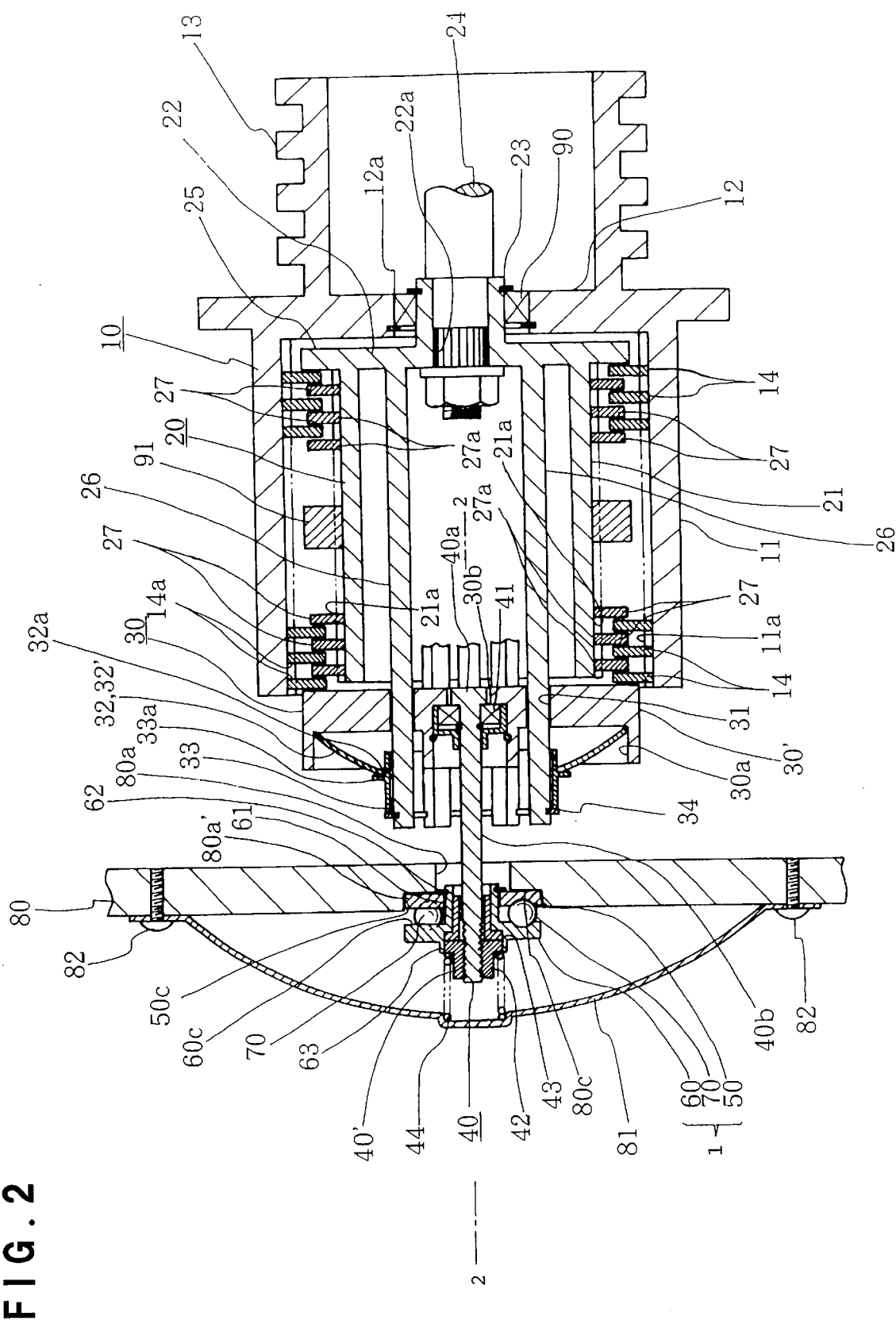
FIG. 2 illustrates a structure of the important portion of the clutch in cross-section in a state where the contact between the driving friction plates and the driven friction plates is released.

FIGS. 1 and 2 are cross-sectional views of a clutch according to this embodiment for schematically illustrating an important portion of the clutch. FIG. 1 illustrates a state in which the clutch is engaged. FIG. 2 illustrates a state in which the clutch is disengaged.

Figure 3:
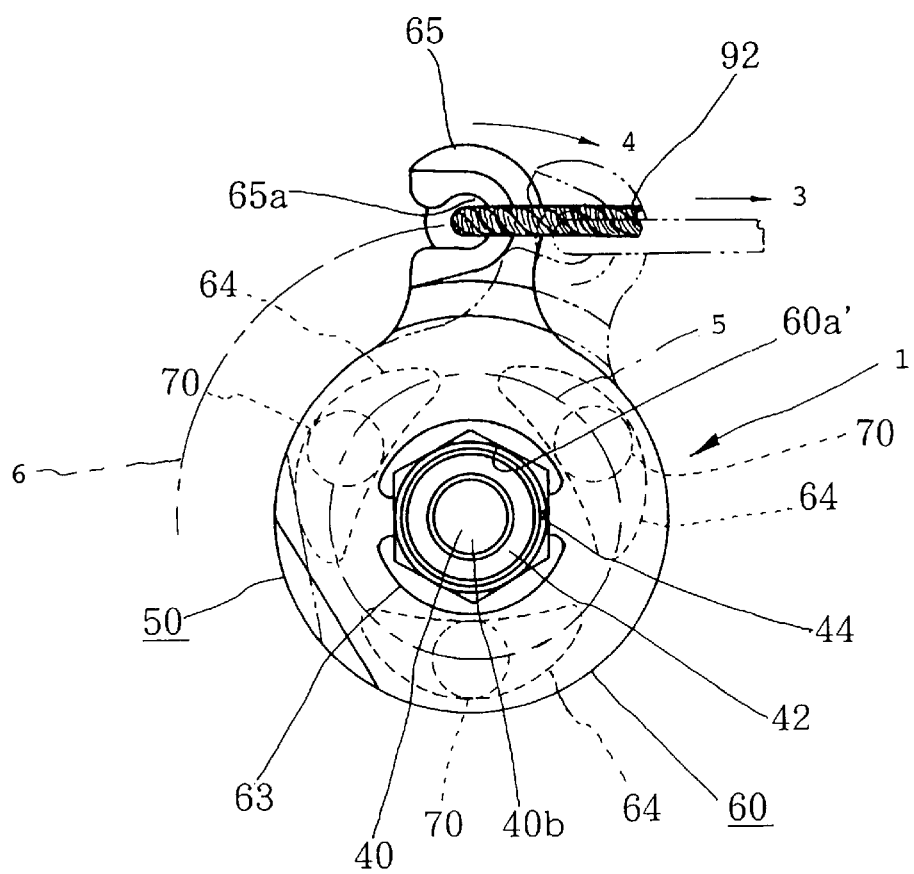
FIG. 3 is a side view of an important portion including an operation rod and a rod driver in the clutch according to the present invention.

FIGS. 3 through 8 illustrate the rod driver used in the clutch according to this embodiment. FIG. 3 is viewed from one side of the clutch in a state in which the rod driver is pulled by a wire. FIGS. 4 through 7 are perspective views of the rod driver 1 respectively viewed from one side in FIG. 4, viewed from the other side in FIG. 5, viewed from the one side by expanding constitutional elements of the rod driver 1 in FIG. 6, and viewed from the other side of the rod driver 1 by expanding constitutional elements of the rod driver 1 in FIG. 7.

Figure 8:
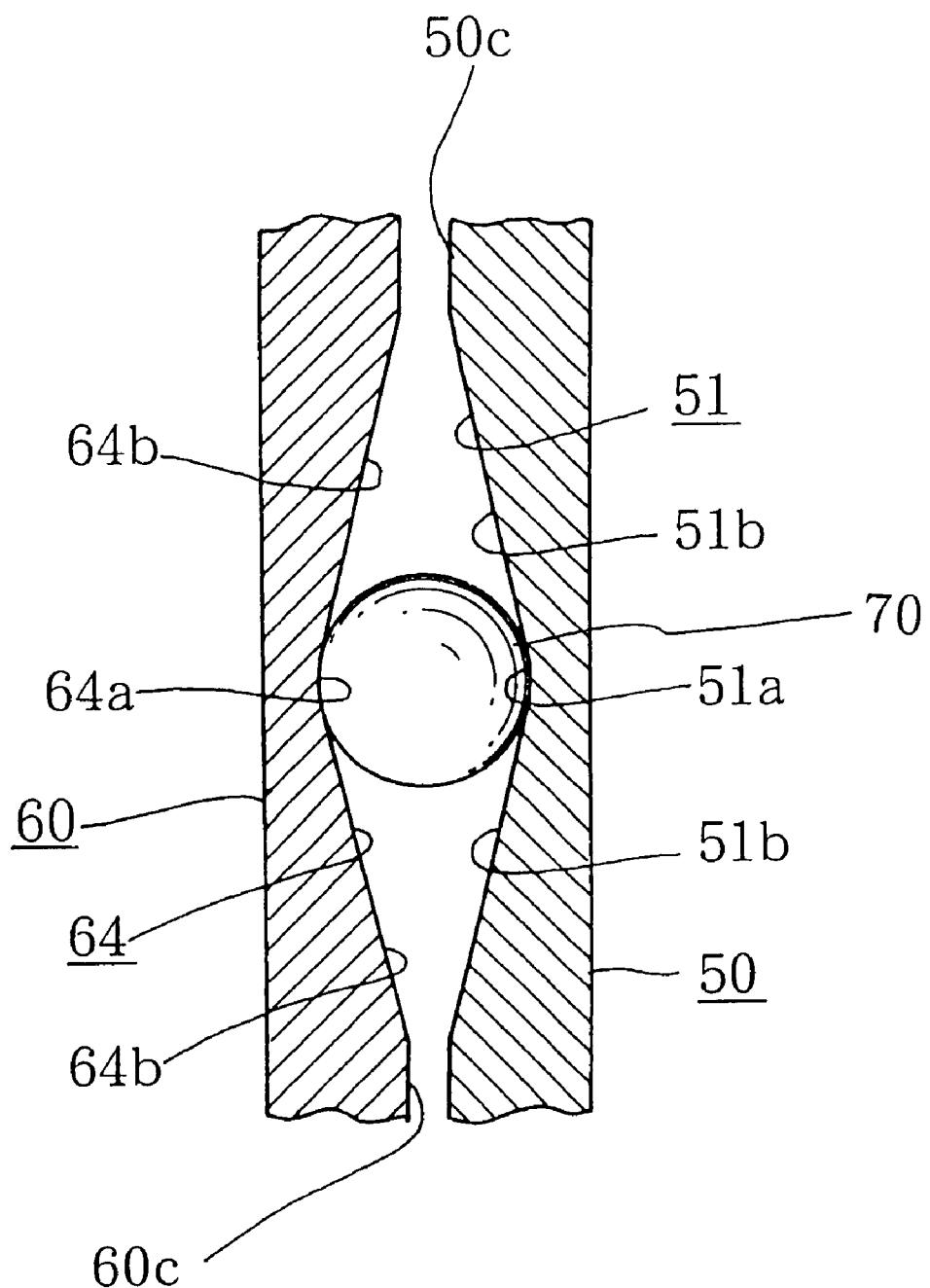
FIG. 8 is a cross-sectional view of the part of the rod driver partly omitted.

Further, FIG. 8 illustrates an important portion of the rod driver 1 in cross-section in a state before rotating the rod driver 1.

Figure 9:
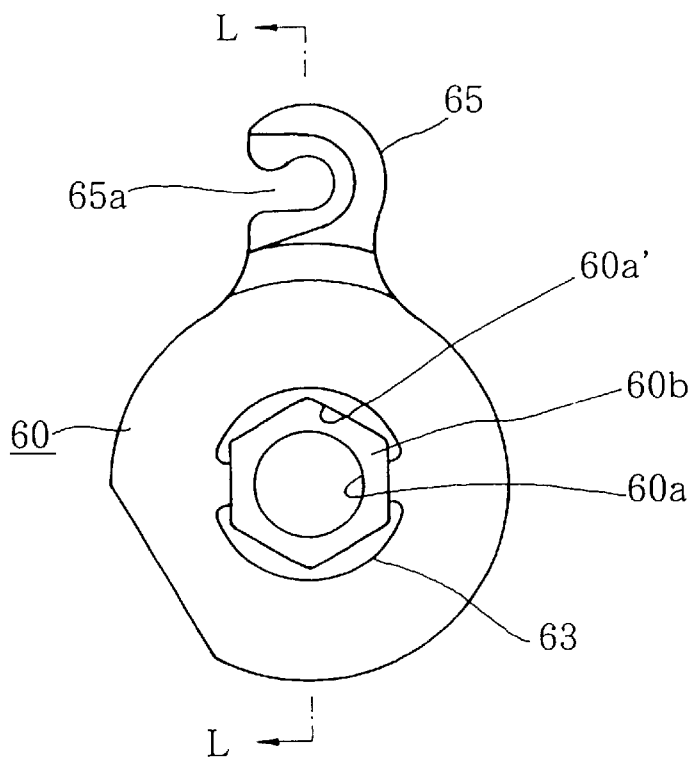
FIG. 9 is a front view of one of the operation members included in the rod driver according to the present invention.
Figure 10:
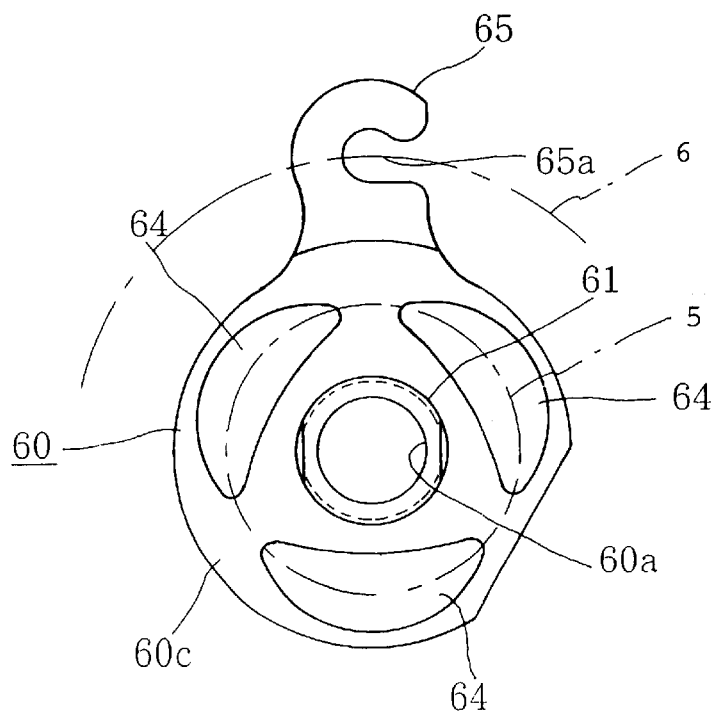
FIG. 10 is a rear view of the operation member illustrated in FIG. 9 according to the present invention.
Figure 11:
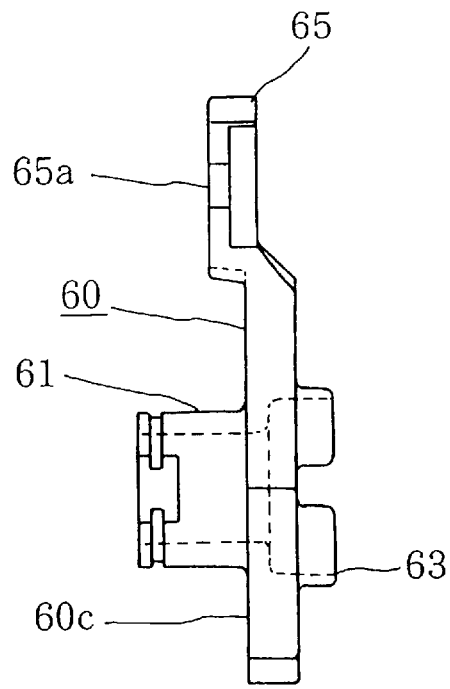
FIG. 11 is a side view of the operation member illustrated in FIG. 9 according to the present invention.
Figure 12:
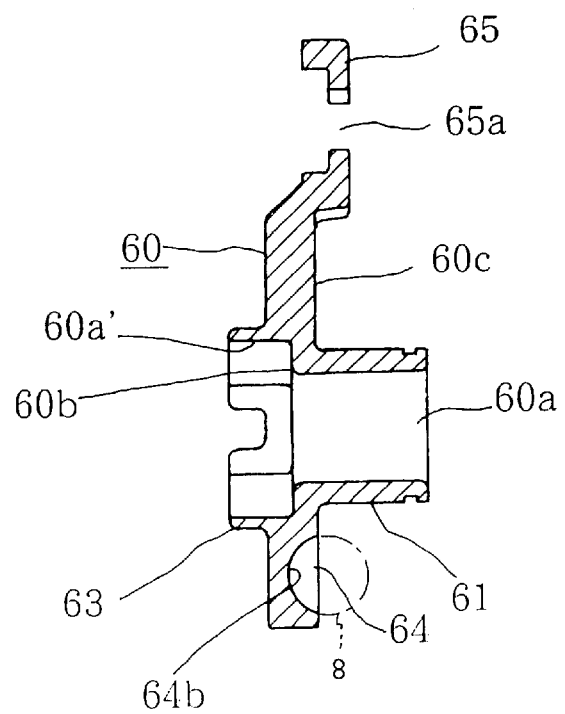
FIG. 12 is a cross-sectional view of the operation member illustrated in FIG. 9 taken along a line L—L.

FIGS. 9 through 14 illustrate one of the operation members 60 of the rod driver 1 used in the clutch according to this embodiment of the present invention. FIG. 9 is viewed from one side of the one of the operating members 60. FIG. 10 is viewed from the other side of the operation member 60. FIG. 11 is viewed from another side of the operation member 60. FIG. 12 is a cross-sectional view of the operation member 60 illustrated in FIG. 9 taken along a line L—L.

FIG. 13 is an enlarged view of an important portion of the operation member 60.

FIG. 14 is a cross-sectional view of the operation member 60 illustrated in FIG. 13 taken along a line M—M.

Figure 15:
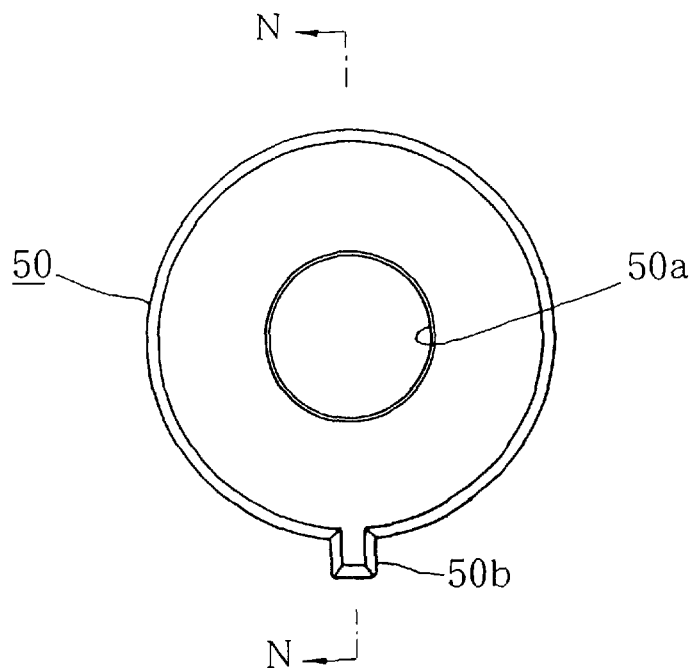
FIG. 15 is a rear view of the other operation member included in the rod driver according to the present invention.
Figure 16:
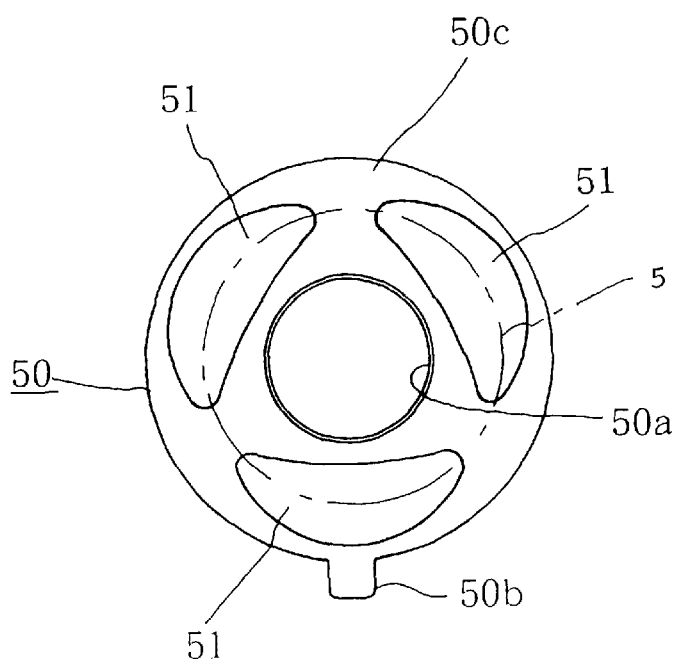
FIG. 16 is a front view of the other operation member illustrated in FIG. 15 according to the present invention.
Figure 17:
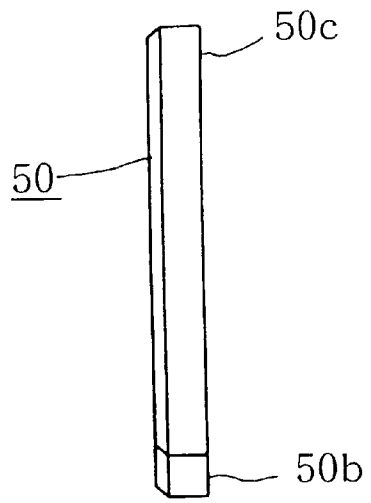
FIG. 17 is a side view of the other operation member illustrated in FIG. 15 according to the present invention.
Figure 18:
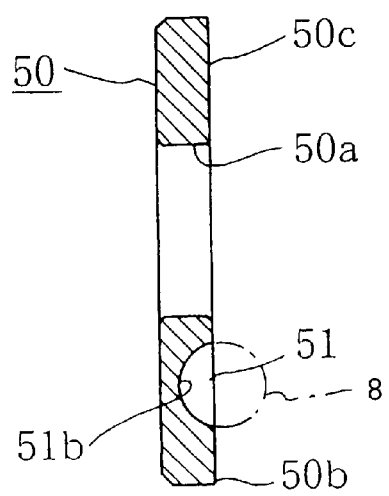
FIG. 18 is a cross-sectional view of the other operation member illustrated in FIG. 15 taken along a line N—N.

FIGS. 15 through 20 illustrate the other operation member 50 of the rod driver 1 used in the clutch according to this embodiment. FIG. 15 is viewed from one side of the other operation member 50. FIG. 16 is viewed from the other side of the other operation member 50. FIG. 17 is viewed from another side of the other operation member 50. FIG. 18 is a cross-sectional view of the other operation member 50 illustrated in FIG. 15 taken along a line N—N.

Figure 19:
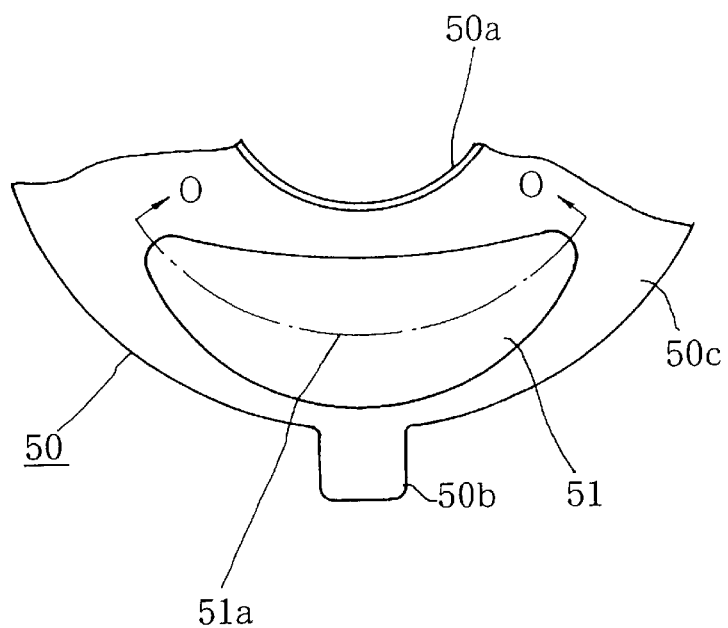
FIG. 19 is a front view of an important portion of the other operation member illustrated in FIG. 16 being partly omitted.

Further, FIG. 19 is an enlarged view of an important portion of the other operation member 50.

Figure 20:
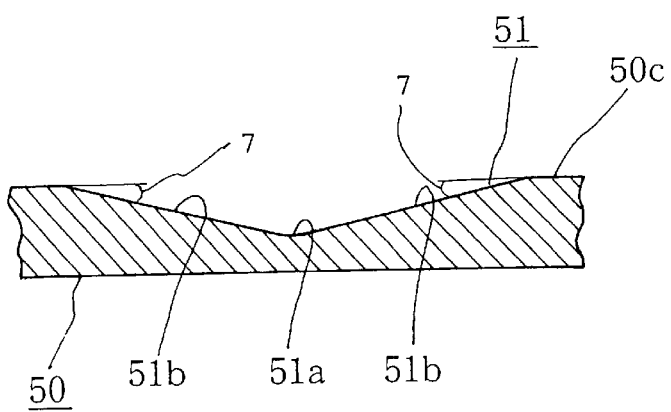
FIG. 20 is a cross-sectional view of the other operation member illustrated in FIG. 19 taken along a line O—O.

FIG. 20 is a cross-sectional view of the other operation member 50 illustrated in FIG. 19 taken along a line O—O.

The clutch according to this embodiment is mainly used in motorcycles and the like.

In the clutch according to this embodiment, as shown in FIG. 1, a pressure plate 30, urged to engage closely driving friction plates 14 and driven friction plates 27 with a pressure, is moved to release the close engagement between the driving friction plates 14 and the driven friction plates 27 against urging by rotating an operation rod (40) with a relatively small force.

Operation of the clutch will be described in detail.

A clutch outer flywheel 10 constituting the clutch is ordinarily a cylindrical body of rotation having a bottom, which is driven by a driving means on a side of an engine. Such a clutch outer flywheel 10 is generally named a clutch shell, a clutch housing, and the like. Specifically, such a clutch outer flywheel 10 is shaped to be a cylindrical body of rotation 11, a diameter of one side of which is relatively large. On the one side, the cylindrical body of rotation 11 is closed by a bearing supporter 12 arranged in a direction perpendicular to an axis of the cylindrical body of rotation 11. A cylindrical sprocket wheel 13 having a small diameter is located in the bearing supporter 12 on a side opposite to the cylindrical body of rotation 11 along an axis center being the same as that of the cylindrical body of rotation 11. The clutch outer flywheel 10 is rotated by an engine through a sprocket chain (not shown) in a belt-like shape, which sprocket chain is engaged with the sprocket wheel 13.

In the thus constructed clutch outer flywheel 10, a clutch center 20 having an output shaft 24 is rotatably located inside of the cylindrical body of rotation 11, namely a cylindrical portion of the cylindrical body of rotation 11, and the driving friction plates 14 and the driven friction plates 27 are located between the clutch outer flywheel 10 and the clutch center 20.

The clutch center 20 located inside the clutch outer flywheel 10 is shaped like a cylinder having a bottom, which is ordinarily named a clutch hub or the like. An attachment plate 22 is located on one side of a cylindrical body of rotation 21 so as to close the one side in a direction perpendicular to an axis of the cylindrical body of rotation 21 with a predetermined interval from an inner peripheral wall of the cylindrical body of rotation 11 of the clutch outer flywheel 10, wherein the cylindrical body of rotation 21 is rotatably located inside the cylindrical body of rotation 11 so as to be rotated around the same rotational axis as that of the cylindrical body of rotation 11. A cylindrical shaft 23 protrudes toward the side opposite to the cylindrical body of rotation 21 from an edge of a hole 22a formed in a center of the attachment plate 22. The cylindrical shaft 23 is rotatably attached to a shaft hole 12a formed in the attachment plate 12 of the clutch outer flywheel 10 through a bearing 90, and the output shaft 24 is integrally attached to the cylindrical shaft 23.

An outer flange 25 elongated from the attachment plate 22, sidewardly protruding from an outer periphery of the cylindrical body of rotation 21, and having a predetermined interval from the inner peripheral wall of the cylindrical body of rotation 11, is formed in the cylindrical body of rotation 21 of the clutch center 20 arranged inside the clutch outer flywheel 10.

A plurality of guide rods 26 outwardly protruding from the cylindrical body of rotation 21 through an inside of the cylindrical body of rotation 21 are formed in the attachment plate 22 so as to be in parallel with an inner peripheral wall of the cylindrical body of rotation 21 along an arc of an imaginary circle around the output shaft 24 with a predetermined interval.

The driving friction plates 14 and the driven friction plates 27 are positioned between an inner peripheral surface of the cylindrical body of rotation 11 and an outer surface of the cylindrical body of rotation 21 respectively of the clutch outer flywheel 10 and of the clutch center 20.

The driving friction plates 14 located between the inner peripheral surface of the cylindrical body of rotation 11 and the outer peripheral surface of the cylindrical body of rotation 21 are shaped like an annular plate having protrusions 14a protruding from an outer periphery of the annular plate with a predetermined interval, which protrusions 14a are engaged with grooves 11a located on the inner peripheral surfaces of the cylindrical body of rotation 11 in a circumferential direction and in parallel with the axis of the cylindrical body of rotation 11 with a predetermined interval so as to be guided by the grooves 11a.

The driving friction plates 14 are arranged so as to be moved in a direction parallel to the center axis of the cylindrical body of rotation 11 along the inner peripheral surface of the cylindrical body of rotation 11 in a state in which the protrusions 14a are inserted in the grooves 11a of the cylindrical body of rotation 11, whereby the cylindrical body of rotation 21 of the clutch center 20 is not prevented from rotating inside the cylindrical body of rotation 11. The driven friction plates 27 located between the inner peripheral surface of the cylindrical body of rotation 11 and the outer peripheral surface of the cylindrical body of rotation 21 are each shaped like an annular plate having protrusions 27a protruding from an inner periphery thereof with a predetermined interval, which protrusions 27a are engaged with grooves 21a located in a circumferential direction on the outer peripheral surface of the cylindrical body of rotation 21 in parallel with the axis of the cylindrical body of rotation 21 with a predetermined interval so as to be guided. The driven friction plates 27 are movable in a direction parallel to the center axis of the cylindrical body of rotation 21 along the outer peripheral surface of the cylindrical body of rotation 21, whereby the cylindrical body of rotation 11 of the clutch outer flywheel 10 is not prevented from rotating around an outer periphery of the cylindrical body of rotation 21.

A plurality of the driving friction plates 14 and a plurality of the driven friction plates 27 respectively located inside the cylindrical body of rotation 11 and outside the cylindrical body of rotation 21 are paired so as to face surfaces of each other between the clutch outer flywheel 10 and the clutch center 20. The driving friction plates 14 on both ends are arranged respectively at a position opposite to the outer flange 25 of the clutch center and at a position opposite to a plate-like surface of the pressure plate 30.

A spring plate 91 is positioned at an arbitrary position between the plurality of the driving friction plates 14 and the plurality of the driven friction plates 27 between the clutch outer flywheel 10 and the clutch center 20.

The pressure plate 30 pushes the driving friction plates 14 and the driven friction plates 27 along the guide rods 26 toward the clutch outer flywheel 10 and the clutch center 20, wherein the guide rods 26 are located in the clutch center 20, rotatably assembled to the clutch outer flywheel 10.

The guide rods 26 are inserted in guide holes 31 formed in the pressure plate 30 in its thickness direction. The pressure plate 30 is movable toward an inside of the cylindrical body of rotation 21 so as to be in contact with the driving friction plates 14 provided in the clutch center 20. Further, the pressure plate 30 is constantly pressed to the driving friction plates 14 and the driven friction plates 27 by an urging means 32 positioned between the guide rods 26 protruding from the guide holes 31 and the pressure plate 30.

The pressure plate 30 attached to the guide rods 26 has a disk-like portion 30' shaped like a relatively thick disk. The guide holes 31 are formed in the disklike portion 30' in its thickness direction. A face of the disk-like portion 30' on a side to be in contact with the driving friction plate 14 is perpendicular to axes of the guide rods 26, namely to the rotational axis of the clutch center 20. A flange 30a is formed on a periphery of a face opposite to the face being in contact with the driving friction plate 14, which flange 30a surrounds so as to protrude from the opposite surface.

The pressure plate 30 inserted in the guide rods 26 is in contact with the driving friction plate 14 on one face thereof. The urging means 32 is positioned between the guide rods 26 and the flange 30a of the pressure plate 30 to push constantly the driving friction plates 14 and the driven friction plates 27 toward the outer flange 25 of the clutch center 20.

The urging means 32 for urging the pressure plate 30 is typically a diaphragm spring 32' forming a part of a spherical shell in an arc-like shape in its cross-section. The diaphragm spring 32' has a circular hole substantially in its center, and insertion holes 32a for receiving the guide rods 26 having an expanding slot from the hole to a side periphery, whereby the guide rods 26 are inserted in the expanding slots of the insertion holes 32a.

The diaphragm spring 32' assembled to the guide rods 26 on a side of the pressure plate 30 constantly presses a peripheral portion on a face of the pressure plate 30 so as to push constantly the driving friction plates 14 and the driven friction plates 27 to the outer flange 25 in a state such that a play exists between the peripheral portion of the diaphragm spring 32' and the flange 30a of the pressure plate 30. A collar 33 is attached to the guide rod 26 outwardly protruding from the insertion hole 32a. The insertion hole 32a is adjacent to an outer flange 33a of the collar 33.

The collar 33 used for assembling the diaphragm spring 32' and the pressure plate 30 so as to urge the pressure plate 30 is secured to the guide rod 26 by a stopper ring 34. The diaphragm spring 32' supported by the stopper rings 34 constantly presses the pressure plate 30, the driving friction plates 14 and the driven friction plates 27, whereby the driving friction plates 14 and the driven friction plates 27 are mutually engaged to transmit a rotation of the clutch outer flywheel 10 to the clutch center 20. Thus, the friction plates 14 and 27 are urged toward the outer flange 25 of the clutch center 20.

The operation rod 40 pushes the pressure plate 30 against urging by the urging means 32 to release the engagement between the driving friction plates 14 and the driven friction plates 27 and to cease the transmission of the driving force of the clutch outer flywheel 10 to the clutch center 20. A bearing 41 is located in an attaching hole 30b formed in the pressure plate 30 in its thickness direction. The clutch center 20 is rotatable by the bearing 41 and a movement of the clutch center 20 in the axial direction is prevented. A head 40a of the operation rod 40 has a larger diameter and is positioned on a side facing the clutch center 20 as viewed from the pressure plate 30. A shaft 40b of the operation rod 40 has a smaller diameter and protrudes toward a side opposite to the clutch center 20 from the head 40a.

The shaft 40b of the operation rod 40 located in the pressure plate 30 outwardly protrudes from a hole 80a formed in a clutch casing 80. The rod driver 1 is attached to the shaft 40b to move the operation rod 40 in its axial direction.

The rod driver 1 includes the first operation member 50, the second operation member 60, and the ball 70, which collaborate to move the operation rod 40.

Figure 6:
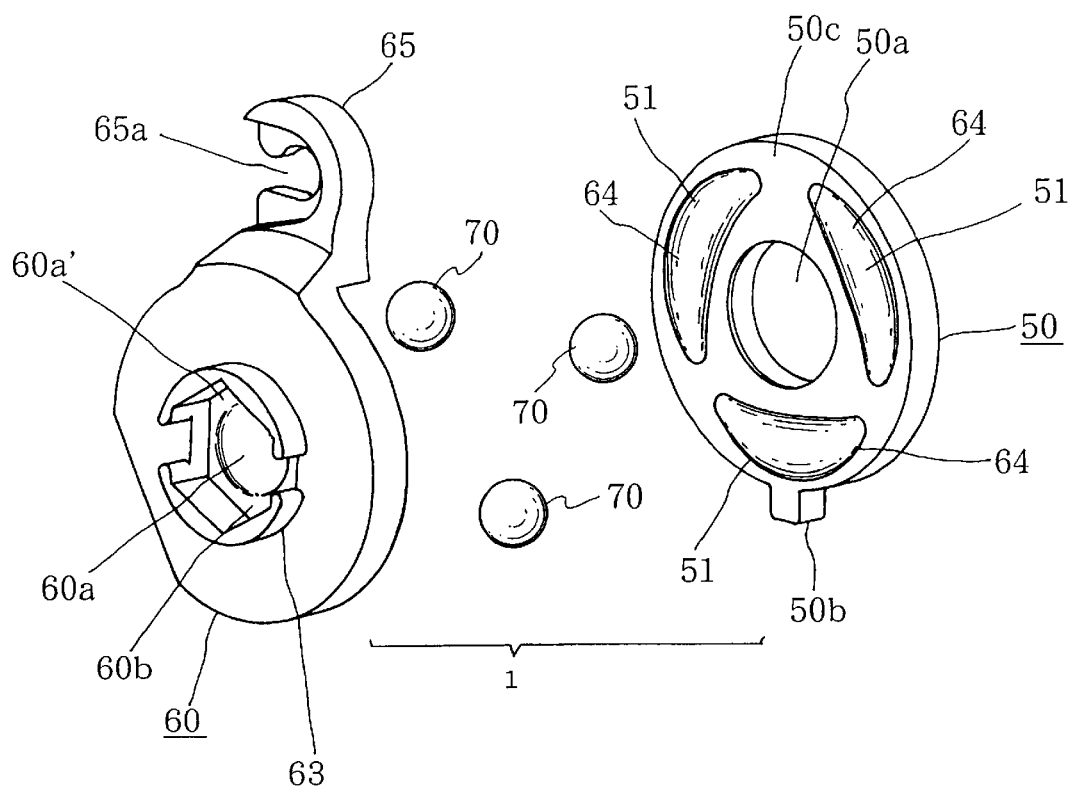
FIG. 6 is a perspective view of the part of the rod driver in an expanded state.

The first operation member 50 and the second operation member 60 used to move the operation rod 40 against urging of the urging means 32 are inserted on the shaft 40b of the operation rod 40. Specifically, one of the operation members (60) is rotatable and the other operation member (50) is not rotatable in a state in which the shaft 40b is inserted, as shown in FIG. 6, into an attaching hole 50a of the first operation member 50 and an attaching hole 60a of a cylindrical shaft 61 seen in FIG. 1 of the second operation member 60. By rotating any one of the first operation member 50 and the second operation member 60, one of the operation members is moved with respect to the other operation member in collaboration with the ball 70 positioned, as best seen in FIG. 6, between the guide groove 51 of the first operation member 50 and the guide groove 64 of the second operation member 60.

In the rod driver 1, as illustrated in FIG. 1, the first operation member 50 accommodated in a recess 80a' having a large diameter, is formed as a part of the hole 80a in an edge of the hole 80a of the clutch casing 80 on a side opposite to the pressure plate 30; the second operation member 60 has the cylindrical shaft 61 to be inserted in the attaching hole 50a of the first operation member 50; and the ball 70 is positioned between the first operation member 50 and the second operation member 60.

The first operation member 50 is in a substantially annular-like shape and has the attaching hole 50a in a center thereof. The first operation member 50 further has a protrusion 50b outwardly protruding from an outer periphery of the first operation member 50. An engagement groove 80b continuously formed in the hole 80a receives the protrusion 50b, and the first operation member 50 is inserted in the recess 80a'. Thus, the first operation member 50 is supported by a step 80c between the recess 80a' and the hole 80a.

Figure 4:
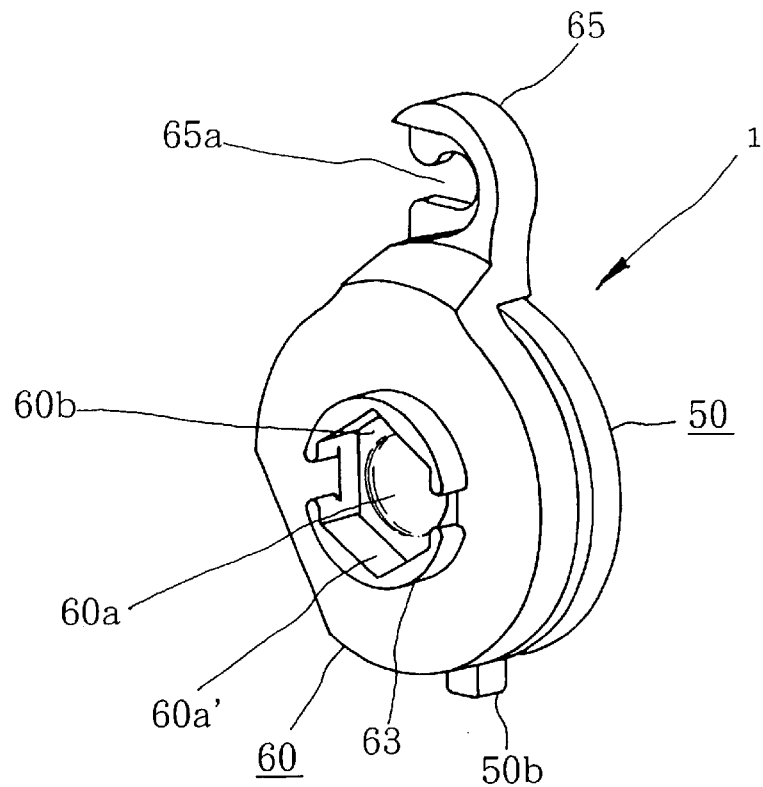
FIG. 4 is a perspective view of a part of the rod driver of the clutch according to the present invention.
Figure 5:
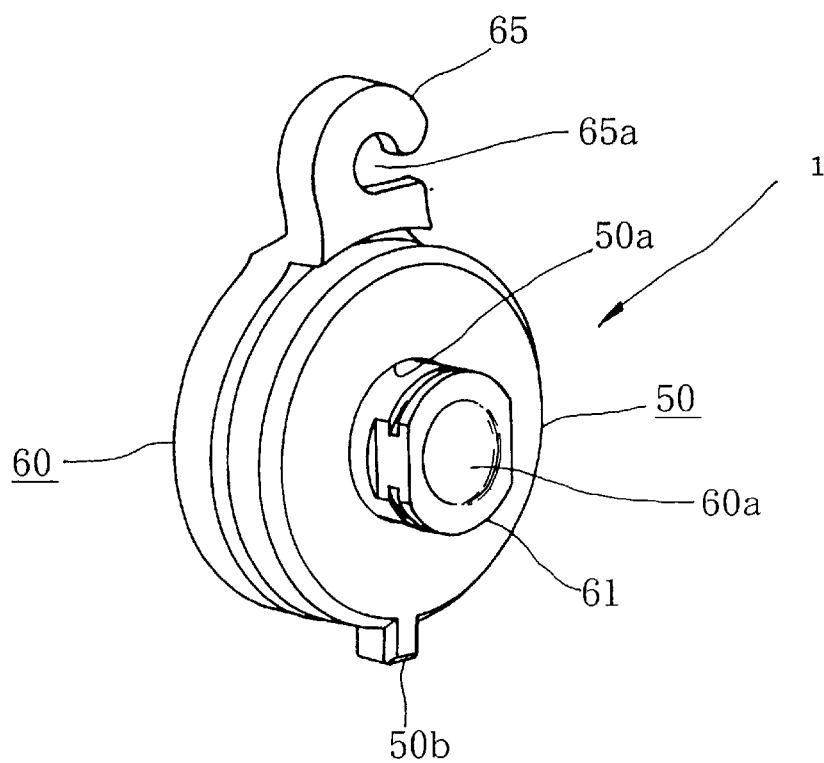
FIG. 5 is a perspective view illustrating the part of the rod driver illustrated in FIG. 4 viewed from the other side thereof.

The second operation member 60 has the cylindrical shaft 61 to be inserted in the attaching hole 50a of the first operation member 50 at a center on a side for attaching the first operation member 50. The other side of the second operation member 60 has a cylindrical protrusion 63 substantially shaped like a disk. As shown in FIG. 5, an attaching hole 60a penetrates through the cylindrical shaft 61, a disk-like portion, and as seen in FIG. 4, the cylindrical protrusion 63 of the second operation member 60.

On a side of the attaching hole 60a where the cylindrical protrusion 63 is located, a recess 60a' and a step 60b are formed. The step 60b is positioned between the recess 60a' and the other side of the cylindrical shaft 61 of the attaching hole 60a best seen in FIG. 5.

The second operation member 60 has an arm 65 shaped like a hook sidewardly protruding from an outer periphery of the second operation member 60. An end of a wire 92 seen in FIG. 3 is attached to a retainer 65a by grappling the end to the retainer 65a.

The first operation member 50 and the second operation member 60 arc assembled by interposing the balls 70 in FIG.

6 between the guide grooves 51 of the first operation member 50 and the guide grooves 64 of the second operation member 60; the cylindrical shaft 61 of FIG. 5 is inserted in the attaching hole 50a of the first operation member 50; and a stopper ring 62 seen in FIG. 1 is fixed to the cylindrical shaft 61 outwardly protruding from the attaching hole 50a, whereby the second operation member 60 is movable with respect to the first operation member 50, and the first operation member 50 is prevented from escaping from the cylindrical shaft 61.

Thus, the assembled first operation member 50 and the second operation member 60 are accommodated in the clutch casing 80 by heading the second operation member 60 on a side of a clutch casing cover 81 with the protrusion 50b of the first operation member 50 engaged with the engagement groove 80b of the clutch casing 80. The disk-like body of the first operation member 50 is accommodated in the recess 80a' of the clutch casing 80. The cylindrical shaft 61 of the second operation member 60 is inserted in the hole 80a of the clutch casing 80 so that the attaching hole 60a of FIG. 5 is opened toward an inside of the clutch casing 80 seen in FIG. 1. The first operation member 50 is prevented from rotating by the engagement between the protrusion 50b of the first operation member 50 and the engagement groove 80b, the second operation member 60 is rotatable with respect to the first operation member 50, and the second operation member 60 is movable in the axial direction of the cylindrical shaft 61 until the first operation member 50 is in contact with the stopper ring 62.

The cylindrical shaft 61 of the rod driver 1 and the shaft 40b of the operation rod 40 are assembled. Specifically, a screw nut 42 is screwed onto an external thread 40' formed on the shaft 40b in a state such that a flange of a sleeve 43 positioned inside of the cylindrical shaft 61 is in contact with the step 60b of the recess 60a' seen in FIG. 4, and the sleeve 43 of FIG. 1 is interposed between the cylindrical shaft 61 and the operation rod 40, whereby the rod driver 1 is connected with the operation rod 40.

A compression coil spring 44 is interposed between the screw nut 42, which is screwed to the operation rod 40 and connected to the rod driver 1, and the clutch casing cover 81 fixed to the clutch casing 80 by screws 82 so as to cover the rod driver 1 and the protruding operation rod 40.

Since the first operation member 50 engaged with the cylindrical shaft 61 and the shaft 40b of the operation rod 40 is accommodated in the clutch casing 80 so as not to rotate, and the second operation member 60 is rotatable with the center of the imaginary line 2 as a center line of an axis of the operation rod 40, when the wire 92, which is connected to the second operation member 60, in a direction 3 in FIG. 3 by manipulating a clutch lever, which is equipped in a steering handle, the second operation member 60 rotates in a direction 4 in FIG. 3. By a relative movement between the first operation member 50 and the second operation member 60, the balls 70, located as shown in FIG. 6 between the guide grooves 51 of the first operation member 50 and the guide grooves 64 of the second operation member 60, are brought to shallow portions in the guide grooves 51 and the guide grooves 64, whereby the second operation member 60 is moved in a direction separating it from the first operation member 50.

Figure 7:
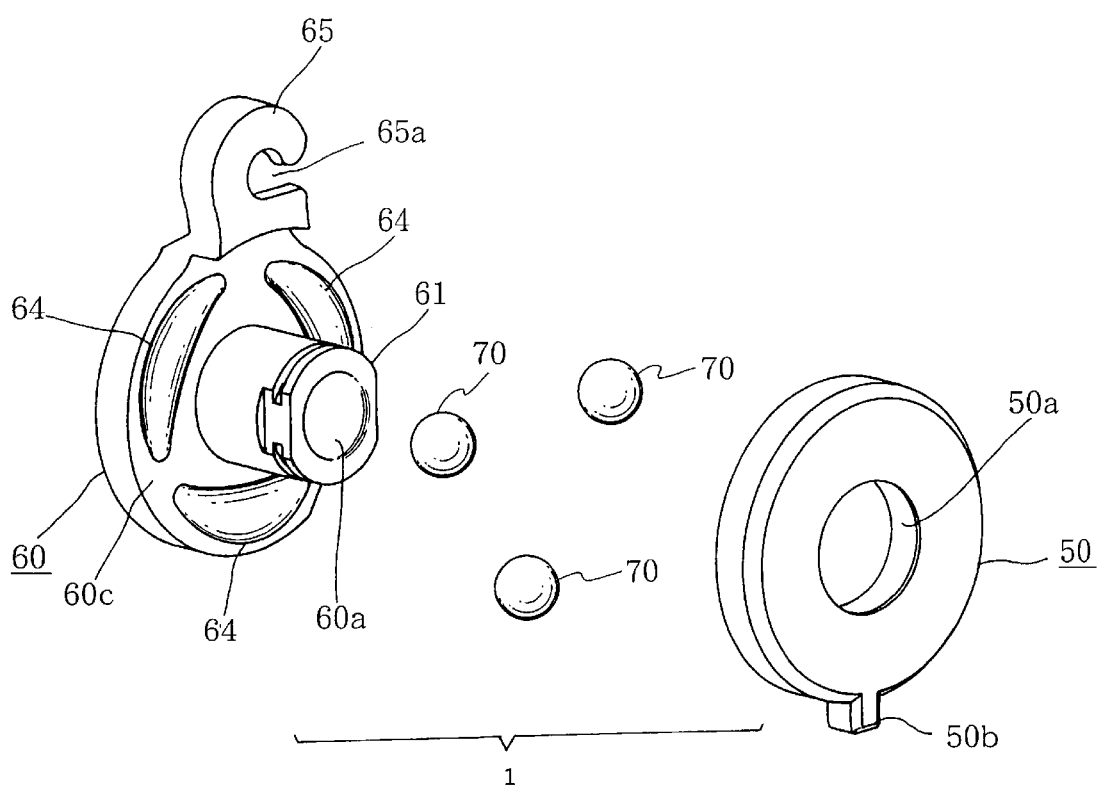
FIG. 7 is a perspective view of the part of the rod driver in the expanded state viewed from the other side according to the present invention.

A plurality of the guide grooves 51 formed in the first operation member 50 and a plurality of the guide grooves 64 formed in the second operation member 60 are arranged on a face 50c of FIG. 6 and a face 60c of FIG. 7 opposite each other in a direction perpendicular to the imaginary line 2 shown in FIG. 1 passing through the central axis of the operation rod 40, and as seen in FIG. 6, the plurality of guide grooves 51 and the plurality of guide grooves 64 are respectively separated with a predetermined interval along an imaginary circle 5 of FIG. 3 with the center of the imaginary line 2 in FIG. 1. As seen in FIG. 8, the bottom slanted surfaces 51b, 64b are respectively slanted from the faces 50c, 60c toward centers 51a, 64a of the guide grooves 51, 64 so as to be gradually deep.

Each of the balls 70 is located inside the guide grooves 51 and the guide grooves 64 so that the balls 70 are in contact with both of the bottom surfaces 51b, 64b of the guide grooves 51, 64 when the balls 70 are positioned at the centers 51a, 64a of the guide grooves 51, 64. In other words, the balls 70 can be rotated inside the guide grooves 51, 64 by rotating the second operation member 60, and when the balls 70 are rotated, the faces 50c and 60c are separated.

The imaginary circle 5 of FIG. 3, along which the guide grooves 51, 64 of FIG. 6 are arranged with the predetermined interval, has a radius of about 19.3 mm from the center of the imaginary line 2 in FIG. 1. A cross-section of the guide grooves 51 and 64 of FIG. 6 in a radial direction from the center of the imaginary circle 5 of FIG. 3 is shaped like an arc forming a part of an imaginary circle 8 seen in FIG. 12 having a diameter of about 11 mm. In FIG. 6, three guide grooves 51 are formed on the face 50c of the first operation member 50 along the imaginary circle 5 of FIG. 3 with a predetermined interval, and also as shown in FIG. 7, three guide grooves 64 are formed on the face 60c of the second operation member 60 along the imaginary circle 5 of FIG. 3 with a predetermined interval.

The guide grooves 51 and 64 of FIG. 6 are symmetrically arranged with respect to a contact surface between the face 50c of FIG. 6 and the face 60c of FIG. 7 so as to be substantially the same at the time of mutually facing the guide grooves 51 and 64 of FIG. 6.

As illustrated in FIG. 8, the centers 51a, 64a of the guide grooves 51 and 64 have a depth of about 3.872 mm. Further, the bottom slanted surfaces 51b, 64b slant by 13.7° through 14.4° toward the centers 51a, 64a from the faces 50c, 60c, as also illustrated in FIGS. 14 and 20.

In the second operation member 60 seen in FIG. 14, the guide grooves 64 are formed to have the bottom surfaces 64b slanted toward the centers 64a, and angles 7 between the faces 60c and the bottom slanted surfaces 64b are about 13.7° through 14.4°, as illustrated in FIG. 14. Further, the centers 64a of the guide grooves 64 have a depth of about 3.872 mm.

Referring to FIG. 19, the guide grooves 51 are formed on the first operation member 50 such that a center line 51a of each of the grooves 51 is in agreement with the imaginary circle 5 of FIG. 3 having a radius of about 19.3 mm with the center of the imaginary line 2 in FIG. 1, which center passes through the axis of the operation rod 40, and the deepest depth of the groove 51 along the center line 51a is about 3.872 mm, as illustrated in FIG. 19.

Further, as seen in FIG. 13, the guide grooves 64 are formed on the first operation member 60 such that a center line 64a of each of the grooves 64 is in agreement with the imaginary circle 5 of FIG. 3 having a radius of about 19.3 mm with the center of the imaginary line 2 in FIG. 1, which center passes through the axis of the operation rod 40, and the deepest depth of the groove 64 along the center line 64a is about 3.872 mm, as illustrated in FIG. 13. Further, as illustrated in FIG. 10, a distance between the center of the imaginary circle 5, which is the rotational axis of the second operation member 60, and a center of the retainer 65a is about 40.35 mm. Therefore, the second operation member 60 is rotated along an imaginary circle 6 having a radius of about 40.35 mm with the center of the imaginary line 2 in FIG. 1 when the second operation member 60 is pulled by the wire 92 shown in FIG. 3.

Further, as seen in FIG. 6, the balls 70 positioned between the guide grooves 51 and 64 are made of steel having a diameter of about 9.5 mm.

In the thus constructed clutch, it is possible to engage and disengage the clutch securely with a relatively small force.

When the angle 7 seen in FIG. 20 between the face 50c and the bottom slanted surface 51b in the guide grooves 51 and the angle 7 seen in FIG. 14 between the face 60c and the bottom slanted surface 64b in the guide grooves 64 are made to be larger than 14.4°, it is necessary to apply a larger force for operating the clutch.

Meanwhile, when the angles 7 in the guide grooves 51 of FIG. 20 and in the guide grooves 64 of FIG. 14 are made to be less than 13.7°, there is difficulty in operating the clutch.

Although a case where the rod driver 1 in FIG. 1 moves the pressure plate 30 upon pulling of the operation rod 40 against urging by the urging means 32 to disconnect the driving friction plates 14 and the driven friction plates 27 has been described, the operation rod 40 may be pushed to disconnect the driving friction plates 14 and the driven friction plates 27 against urging of the pressure plate 30; for example, the rod driver 1 may be located on a side opposite to the pressure plate 30 through the shaft 40b of the operation rod 40 penetrating an inside of the output shaft 24.

The first advantage of the clutch for motorcycles and the like according to the present invention is that the pressure plate 30 urged to press the driving friction plates 14 and the driven friction plates 27 in a direction of closely engaging these plates 14 and 27 is moved in a direction of releasing the engagement between the driving friction plates 14 and the driven friction plates 27 with a relatively small force against urging.

Clearly, numerous modifications and variations of the present invention are possible in light of the above teachings. It is therefore to be understood that, within the scope of the appended claims, the invention may be practiced otherwise than as specifically described herein.

The entire disclosure of Japanese Patent Application Serial No. 11-009967 filed on Nov. 28, 1999, including the specification, claims, drawings and summary are incorporated herein by reference in its entirety.

What is claimed is:

1. A clutch including a rod driver for driving an operation rod in a direction of an axis of the operation rod, which operation rod drives a pressure plate urged to push a driving friction plate and a driven friction plate so as to be engaged with each other against urging of the pressure plate, which rod driver comprising:

a pair of operation members having surfaces which are opposite to each other and being arranged in a direction perpendicular to an imaginary line passing through a central axis of the operation rod, and one of which operation members is rotatable around a center axis of the imaginary line and the other operation member is unrotatable, wherein the pair of the operation members respectively have guide grooves, a central line of which guide grooves is provided in an outer periphery of an imaginary circle having a radius of about 19.3 mm, which guide grooves are separated by a predetermined interval, and cross-sections of which guide grooves are shaped like an arc being a part of an imaginary circle having a diameter of about 11 mm in a direction from the imaginary line to the periphery of the operation members; and balls having a diameter of about 9.5 mm, each of which balls is positioned respectively in the guide grooves so as to be in contact with a bottom surface of each of the guide grooves, and located between the pair of the operation members, wherein one of the operation members is separated from the other operation member by a rotational operation around an imaginary circle having a radius of about 40.35 mm with a center of the rotational axis, wherein the operation rod located in the pressure plate is moved by a movement of the other operation member by separating from the one of the operation members, and wherein the guide grooves are provided on opposite surfaces of the operation members and respectively have a slant with an angle of 13.7° through 14.4° with respect to the opposite surfaces, and a depth of each of the guide grooves gradually increases toward a center of the guide groove and is about 3.872 mm at the center of the guide grooves.

2. A clutch comprising:

a clutch outer flywheel;

a clutch center located inside the clutch outer flywheel so as to be rotatable around a rotational axis being the same as that of the clutch outer flywheel;

driving friction plates being a plurality of annular plates movably located inside the clutch outer flywheel so as to be moved toward a direction of the rotational axis of the clutch outer flywheel;

driven friction plates being a plurality of annular plates movably located outside the clutch center so as to be moved toward a direction of the rotational axis of the clutch center, surfaces of the annular plates are arranged opposite to surfaces of the annular plates of the driving friction plates;

a pressure plate, located on the clutch center, for urging to engage closely the driving friction plates and the driven friction plates with a pressure;

an operation rod, located in the pressure plate, for moving the pressure plate to release close engagement between the driving friction plates and the driven friction plates against urging by the pressure plate; and a rod driver for moving the operation rod in an axial direction of the operation rod, wherein the rod driver includes a pair of operation members, which operation members have surfaces opposite to each other, which surfaces are perpendicular to an imaginary line passing through a central line of a rod shaft of the operation rod, one of which operation members is rotatably located around a rotation axis of the imaginary line and the other is unrotatably located, and which operation members respectively have guide grooves, which are arranged around an imaginary circle having a radius of about 19.3 mm with a center of the imaginary line with a predetermined interval on the surfaces of the operation members opposing each other, cross-sections of which guide grooves are like an arc as a part of the imaginary circle having a diameter of about 11 mm in a direction from a center of the imaginary circle to an outer periphery of the imaginary circle, and a depth of which guide grooves is deepest in a center of each of the guide grooves and becomes gradually less toward both sides of the guide grooves, wherein the rod driver further includes balls having a diameter of about 9.5 mm, each of which balls is respectively located in each of the guide grooves so as to be in contact with a bottom surface of the guide grooves and which are located between the pair of operation members, wherein the one of the operation members is separated from the other operation member by a rotation along an imaginary circle having a radius of about 40.35 mm with a center of the rotational axis of the one of the operation members, wherein the operation rod located in the pressure plate is moved by a movement of the other operation member by separating from the one of the operation members, and wherein the guide grooves, which are provided on the opposing surfaces of the operation members and formed to slant so as to increase gradually the depth thereof respectively toward the center of the guide grooves having a depth of about 3.872 mm at the centers of the guide grooves, and the slant of each of the guide grooves is about 13.7° through 14.4° with respect to the opposing surfaces of the operation members.

3. A clutch comprising:

a driving friction plate and a driven friction plate;

a pressure plate urged to push the friction plates so as to be engaged with each other;

an operation rod configured to drive the pressure plate; and a rod driver configured to drive the operation rod against the pressure plate, said rod driver including:
  a pair of operation members having faces which are opposed to each other and which are arranged perpendicular to a central longitudinal axis of the operation rod, one of the operation members being rotatable around said central longitudinal axis and the other operation member being unrotatable, wherein said pair of operation members have guide grooves separated by a predetermined interval and each shaped in cross section like an arc; and
  balls positioned in the guide grooves in contact with a bottom surface thereof and held between the pair of operation members, said guide grooves being provided on the opposed faces of the operation members, each of said guide grooves having a slant with respect to the opposed faces and also having a depth gradually increasing towards the bottom surface to a maximum depth at a center thereof.

4. A clutch comprising:

an outer clutch flywheel;

an inner clutch center located inside the outer clutch flywheel so as to be rotatable around a common central rotational axis;

driving friction plates movably located inside the outer clutch flywheel;

driven friction plates movably located outside the inner clutch center;

a pressure plate located on the inner clutch center and configured to urge the friction plates to engage closely with each other;

an operation rod arranged through a center of the pressure plate and configured to force the pressure plate to release the friction plates when engaged closely with each other; and a rod driver configured to move the operation rod along a central longitudinal axis thereof, said rod driver including:
  a pair of operation members having faces opposed to each other and arranged perpendicular to the central longitudinal axis of the operation rod, one of the operation members being rotatable around the central longitudinal axis of the operation rod and the other of the operation members being unrotatable, said operation members having guide grooves arranged around the central longitudinal axis of the operation rod with a predetermined interval on the opposed faces of the operation members, each of the guide grooves being shaped like an arc and having a depth which is deepest in a center and which becomes gradually less towards both sides of each of the guide grooves; and
  balls positioned in each of the guide grooves in contact with a bottom surface thereof between the opposed faces of the operation member, each of the guide grooves having a slant so as to increase gradually a depth thereof to a maximum at a center of the bottom surface thereof.

* * * * *